United States Patent [19]

Hampton

[11] Patent Number: 4,611,422

[45] Date of Patent: Sep. 16, 1986

[54] FISHING LURE WITH SEPARABLE BODY AND HOOK TRACK

[76] Inventor: Douglas R. Hampton, Rte. #1, Box 422, Firth, Id. 83236

[21] Appl. No.: 642,515

[22] Filed: Aug. 20, 1984

[51] Int. Cl.$^4$ .............................................. A01K 85/00
[52] U.S. Cl. .................... 43/42.36; 43/42.38; 43/42.49
[58] Field of Search ............... 43/42.36, 42.38, 42.49, 43/42.09, 42.08, 42.23, 42.72, 43.1, 44.83, 44.88

[56] References Cited

U.S. PATENT DOCUMENTS

| | | | |
|---|---|---|---|
| 2,127,639 | 8/1938 | Breuer | 43/42.09 |
| 2,609,633 | 9/1952 | Cracker | 43/42.36 |
| 2,659,175 | 11/1953 | Carpenter | 43/42.36 |
| 3,138,892 | 6/1964 | Hall | 43/42.25 |
| 3,299,561 | 1/1967 | Desbois | 43/42.38 |
| 3,368,299 | 2/1968 | Scheidt | 43/44.83 |

Primary Examiner—Gene P. Crosby
Attorney, Agent, or Firm—Harvey B. Jacobson

[57] ABSTRACT

A fishing lure comprises a body member attractive to fish and a separable hook track, with suspended hooks, which is slidingly received in a guideway formed along the bottom of the body member. The body member and hook track are secured to the end of a fishing line by separate drop leader lines, the hook track drop leader being shorter than the body member drop leader. If the hooks should snag and tension be applied to the fishing line, the hook track drop leader will tend to break before the body member drop leader, so that when the hook track drop leader is broken away, continued application of tension to the fishing line will cause the body member to slide off of the snagged hook track, allowing the body member to be recovered.

8 Claims, 5 Drawing Figures

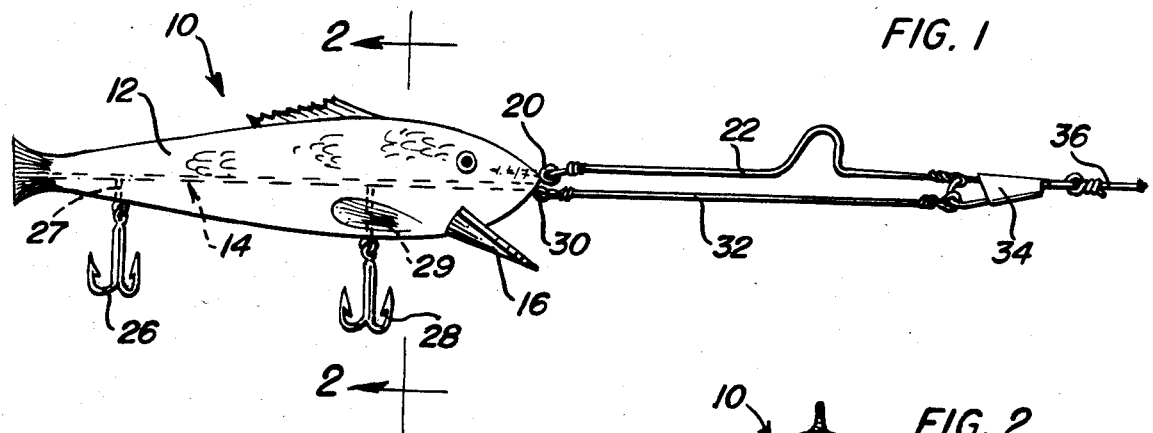
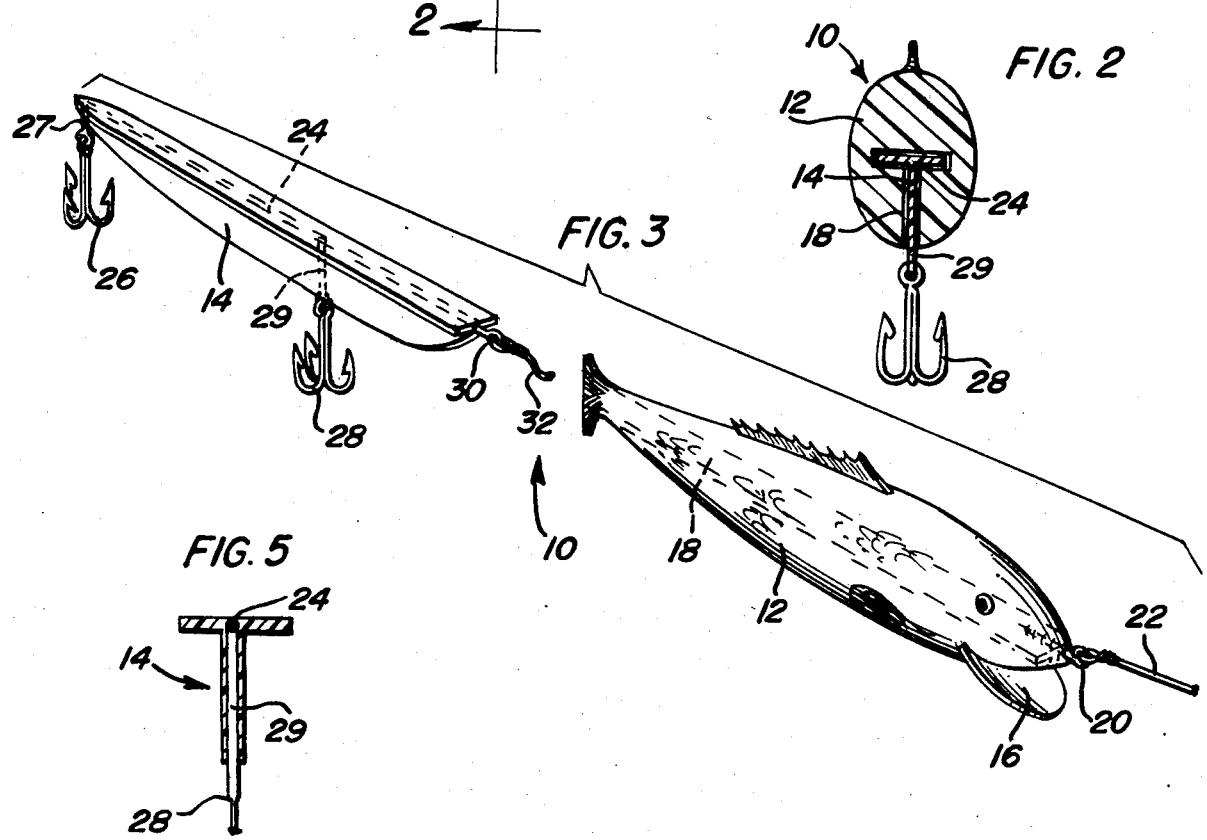
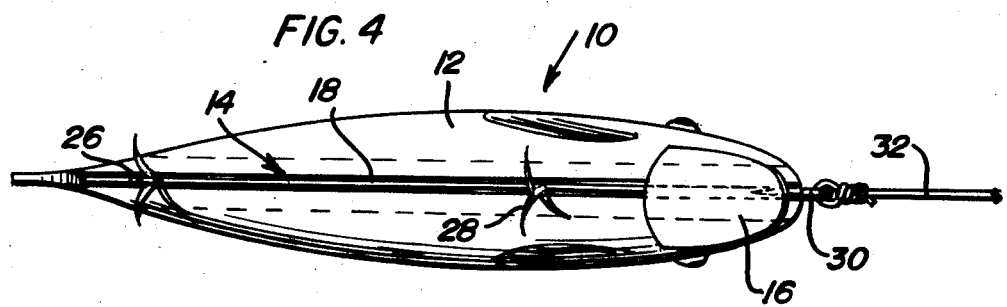

… (continued)

FISHING LURE WITH SEPARABLE BODY AND HOOK TRACK

BACKGROUND OF THE INVENTION

Fishing lures are items of fishing tackle used at the ends of fishing lines, and which generally comprise a body member designed to attract fish, and at least one hook associated with the body member, so that in a fish's efforts, for example, to swallow the lure, the fish is hooked. A problem arising with lures, however, is that should the lure become snagged prior to a strike, and should tension be applied to the line in an effort to free the lure, the line may snap and the lure, which is a relatively expensive item, may be lost. The present invention is directed toward overcoming this problem.

DESCRIPTION OF THE PRIOR ART

The following U.S. patents disclose fishing lures and the like, a number of which have separable hooks. None of the patents, however, discloses a lure having the features of the present invention.

U.S. Pat. No. 813,500, Feb. 27, 1906;
U.S. Pat. No. 2,523,833, Nov. 26, 1950;
U.S. Pat. No. 2,556,117, June 5, 1951;
U.S. Pat. No. 2,884,733, May 5, 1959;
U.S. Pat. No. 2,992,507, July 18, 1961;
U.S. Pat. No. 3,138,892, June 30, 1964.

SUMMARY OF THE INVENTION

In accordance with the invention, a fishing lure is formed of separable components, notably a body member designed to attract fish, a hook track releasably associated with the body member, the hook track being provided with one or more hooks, and means for connecting the body member and hook track independently to the end of a fishing line in a manner whereby, in the event a hook becomes snagged and tension is applied to the line in an effort to free the hook, the hook track has a tendency to break away from the line in preference to the body member, permitting separation of the body member from the hook track and recovery of the body member. Accordingly, in the event of a snag, only the relatively inexpensive hook track is lost and the body member (the relatively expensive portion of the lure, which may, for example, simulate a small fish) can be recovered.

The hook track may, for example, comprise an elongate profiled member with one or more hooks attached thereto, and which slides longitudinally into a complementary guideway formed along the bottom of the body member, so that the hook or hooks are suspended below the body member. The means for independently attaching the hook track and body member to the end of the fishing line may comprise individual drop leader lines, with the drop leader of the body member being somewhat longer than the drop leader for the hook track so that in the event of a snag, the hook track drop leader will become tensioned and tend to snap in preference to that of the body member.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of a fishing lure in accordance with the invention.
FIG. 2 is a cross-sectional view on line 2—2 of FIG. 1.
FIG. 3 is a exploded perspective view of the lure.
FIG. 4 is an underneath plan view of the lure.
FIG. 5 is an enlarged cross-sectional view of a hook track, forming part of the lure.

DESCRIPTION OF THE PREFERRED EMBODIMENT

A fishing lure in accordance with the invention is generally indicated by reference 10 in the drawings, and comprises a body member 12 and a hook track 14 releasably associated with the body member as will be described.

Body member 12 which may be molded in plastic, may be formed to simulate a small fish, or may be of any other suitable form attractive to fish, and may have the customary diver 16. Along its base, the body member is formed with an elongate T-shaped channel or guideway 18 for the hook track, the guideway extending along the whole length of the body member. At its forward end, the body member is provided with an embedded eye 20 for attachment of a first drop leader line 22.

Hook track 14 may also be a plastic molding of T-shaped profile, complementary to the profile of guideway 18. The hook track may, for example, be molded around a wire loop 24 provided with hooks 26, 28 depending on wires 27, 29, and an attachment eye 30 at its forward end for a second drop leader line 32 which should be shorter than line 22, for example, by about 2-3 inches.

Hook track 14 is adapted to slide through guideway 18 and in use is slid into the body member as shown, with the hooks suspended below the body member. The respective drop leader lines may be attached to a swivel eye 34 at the end of a fishing line 36, for example. The lure operates in conventional manner in hooking fish. Should one of the hooks, however, become snagged and tension be applied to line 36, line 32 being shorter than line 22 will be tensioned and tend to snap before line 22. Then, upon snapping of line 32, continued application of tension to line 36 will pull the body member 12 off of the snagged hook track 14, allowing the body member to be recovered and reused with another hook track. Similar results may be achieved if lines 22 and 32 are made of similar length, but with line 32 being weaker in tension than line 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing lure comprising a body member for attracting fish, a hook track with at least one hook, means for releasably securing the hook track to the body member, and first and second connector means for independently connecting the hook track and body member respectively to the end of a fishing line for breaking away of the first connector means from the line in preference to the second connector means in the event of the hook being snagged, and tension being applied to the fishing line, whereby the hook and track tends to break away from the fishing line in preference to the body member and separate from the body member allowing the body member to be recovered, wherein the securing means comprises means for providing a sliding connection between the body member and the hook track, wherein the means providing a sliding connection comprises a longitudinal profiled guideway formed along the body member for slidingly receiving the hook track, and wherein the guideway and hook track are of complementary T-shaped cross section, the hook track including at least one hook depending from the upright of the T.

2. The invention of claim 1 wherein the first connector means comprises a first drop leader line for connecting the hook track to the end of the fishing line, and the second connector means comprises a second drop leader line for connecting the body member to the fishing line, wherein the first drop leader line is adapted to break under tension applied to the fishing line before the second drop leader line.

3. The invention of claim 2 wherein the first drop leader line is shorter than the second drop leader line.

4. A fishing lure comprising a body member for attracting fish, a hook track with at least one hook, means for releasably securing the hook track to the body member, and means for connecting the hook track and body member independently to the end of a fishing line in a manner whereby in the event of the hook being snagged, and tension being applied to the fishing line, the hook track tends to break away from the fishing line in preference to the body member and separate from the body member allowing the body member to be recovered, the securing means comprising means for providing a sliding connection between the body member and the hook track, said means providing a sliding connection comprising a longitudinal profiled guideway formed along the body member for slidingly receiving the hook track, wherein the hook track comprises a plastic element molded on a wire carrying the hook.

5. A fishing lure comprising a body member for attracting fish, a hook track with at least one fish hook, means releasably connecting the hook track to the body member for longitudinal sliding disconnection thereof when the body member is pulled lengthwise from a forward end thereof while the hook track is restrained, wherein the means releasably connecting the hook track to the body member comprises a longitudinally extending profiled guideway formed along the body member, the guideway being open at the bottom of the body member for slidingly receiving the hook track, with the hook suspended under the guideway, wherein the hook track and guideway are of complementary T-shaped cross section and the hook track comprises a plastic element molded on a wire carrying the hook.

6. The invention of claim 5 wherein the lure includes first and second line connectors on the body member and hook track respectively attached to respective first and second drop leader lines, the drop leader line attached to the hook track being adapted to break under tension prior to the drop leader line attached to the body member.

7. The invention of claim 6 wherein the drop leader line attached to the hook track is shorter than the drop leader line attached to the body member.

8. The invention of claim 5 including a connector for attaching both drop leader lines to the end of a fishing line.

* * * * *